United States Patent
Kaminski et al.

(10) Patent No.: US 9,521,686 B2
(45) Date of Patent: Dec. 13, 2016

(54) METHOD FOR SCHEDULING OF SERVICE DATA IN DOWNLINK, A BASE STATION, A USER TERMINAL AND A COMMUNICATION NETWORK THEREFOR

(75) Inventors: Stephen Kaminski, Eislingen (DE); Uwe Doetsch, Schwieberdingen (DE); Osman Aydin, Stuttgart (DE); Hajo Bakker, Eberdingen (DE); Klaus Keil, Esslingen (DE); Markus Gruber, Korntal-Munchingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 2109 days.

(21) Appl. No.: 12/050,571

(22) Filed: Mar. 18, 2008

(65) Prior Publication Data
US 2008/0233886 A1 Sep. 25, 2008

(30) Foreign Application Priority Data

Mar. 20, 2007 (EP) .................... 07300884

(51) Int. Cl.
| | |
|---|---|
| *H04W 8/00* | (2009.01) |
| *H04W 72/12* | (2009.01) |
| *H04L 1/16* | (2006.01) |
| *H04L 1/18* | (2006.01) |

(52) U.S. Cl.
CPC ........ *H04W 72/1289* (2013.01); *H04L 1/1607* (2013.01); *H04L 1/1854* (2013.01); *H04L 1/1887* (2013.01); *H04L 1/1896* (2013.01)

(58) Field of Classification Search
USPC ..... 455/411, 447, 452.2, 70, 550.1, 509, 69; 714/776, 746; 370/229, 352, 328, 280, 315
See application file for complete search history.

(56) References Cited

U.S. PATENT DOCUMENTS

| | | | | |
|---|---|---|---|---|
| 5,742,909 | A | * | 4/1998 | Uchida et al. ................. 455/517 |
| 5,745,860 | A | * | 4/1998 | Kallin ............................ 455/574 |
| 6,028,854 | A | * | 2/2000 | Raith et al. .................... 370/347 |

(Continued)

FOREIGN PATENT DOCUMENTS

| | | |
|---|---|---|
| EP | 1538863 A1 | 6/2005 |
| EP | 1643690 A1 | 4/2006 |

(Continued)

OTHER PUBLICATIONS

Samsung: "VoIP support in LTE", 3GPP TSG-RAN WG2 #54, R2-062218, (Online) Aug. 28-Sep. 1, 2006, pp. 1-3, XP002447189.

(Continued)

*Primary Examiner* — Ganiyu A Hanidu
(74) *Attorney, Agent, or Firm* — Fay Sharpe, LLP

(57) ABSTRACT

The invention concerns a method for scheduling of service data intended to be sent from a base station (BS1) over radio interfaces to a user terminal (UE1) by means of at least one control message sent from the base station (BS1) to the user terminal (UE1), whereby said at least one control message comprises or allows for a determination of at least one of the orders when the user terminal (UE1) shall perform reception of downlink data and when and under which circumstances the user terminal (UE1) shall send HARQ feedback information in upcoming transmission time intervals (TTI), a base station (BS1), a user terminal (UE1) and a communication network therefor.

20 Claims, 3 Drawing Sheets

(56) References Cited

U.S. PATENT DOCUMENTS

| | | | |
|---|---|---|---|
| 7,272,400 B1* | 9/2007 | Othmer | 455/453 |
| 7,618,476 B2* | 11/2009 | Ichikawa et al. | 75/484 |
| 7,623,869 B2* | 11/2009 | Lee et al. | 455/452.2 |
| 7,929,636 B2* | 4/2011 | Kotecha | 375/285 |
| 2004/0208160 A1* | 10/2004 | Petrovic et al. | 370/350 |
| 2007/0106924 A1* | 5/2007 | Seidel et al. | 714/748 |
| 2008/0144561 A1* | 6/2008 | Kaikkonen et al. | 370/315 |
| 2009/0052381 A1* | 2/2009 | Gorokhov et al. | 370/329 |
| 2009/0274107 A1* | 11/2009 | Park et al. | 370/329 |
| 2013/0010729 A1* | 1/2013 | Novak et al. | 370/329 |
| 2013/0039333 A1* | 2/2013 | Li et al. | 370/330 |

FOREIGN PATENT DOCUMENTS

| | | | | |
|---|---|---|---|---|
| WO | WO2005078962 | * | 8/2005 | H04B 7/26 |
| WO | WO 2005078962 A1 | | 8/2005 | |
| WO | WO 2007/018406 A1 | | 2/2007 | |

OTHER PUBLICATIONS

NTT Docomo: "Uplink resource allocation scheme", 3GPP TSG-RAN WG2 #54, R2-062164 (Online) Aug. 28-Sep. 1, 2006, pp. 1-5, XP002447190.

Nokia: "Way Forward for UL Scheduling", 3GPP TSG RAN WG2 #57, R2-070967 (Online) Feb. 12-Feb. 16, 2007, p. 1, XP002447191.

Ericsson: "Comparison of scheduling methods for LTE", 3GPP TSG RAN WG2 #57, R2-0796 (Online) Feb. 12-16, 2007, pp. 1-5, XP002447192.

Technical Specification Group Radio Access Network: "3GPP TS 36.300 V1.0.0: Evolved Universal Terrestrial Radio Access (E-UTRA) and Evolved Universal Terrestrial Radio Access Network (E-UTRAN); Overall Description; Stage 2 (Release 8)" Mar. 19, 2007, $3^{rd}$ Generation Partnership Project (3GPP); Technical Specification (TS), pp. 1-82, XP002447408.

* cited by examiner

METHOD FOR SCHEDULING OF SERVICE DATA IN DOWNLINK, A BASE STATION, A USER TERMINAL AND A COMMUNICATION NETWORK THEREFOR

BACKGROUND OF THE INVENTION

The invention is based on a priority application EP07300884.9 which is hereby incorporated by reference.

The invention relates to a method for scheduling of service data according to the preamble of claim 1, a user terminal according to the preamble of claim 11, a base station according to the preamble of claim 13 and a communication network according to the preamble of claim 14.

Typically, a base station in a cellular radio communication network comprises resource schedulers that allocate physical layer resources for the downlink and uplink transport channels used for communication with user terminals with different schedulers operating for the downlink and the uplink.

Scheduling of services like e.g. conversational and streaming services such as Voice over Internet Protocol (VoIP) in cellular radio communication networks is often performed taking into account the quality of service (QoS) requirements as well as the radio conditions in the corresponding serving radio cell, i.e. the scheduler preferably takes account of the traffic volume and the QoS requirements of each user terminal and associated radio bearers, when sharing resources like e.g. a frequency resource divided into resource blocks between user terminals.

Schedulers may assign physical layer resources taking into account the radio conditions at the user terminal identified through measurements made at the base station and/or reported by the user terminal.

Radio resource allocations can be valid for one or multiple so-called transmission time intervals (TTI).

Radio resource assignments comprise assignments of physical resource blocks (PRB) and modulation and coding schemes (MCS). Allocations for time periods longer than one transmission time interval might also require additional information, as e.g. allocation time or allocation repetition factor.

Basic scheduler operations are e.g. described in the document 3GPP TS 36.300 VL.0.0 (2007-03); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 8) in the chapters 11.1 and 11.2.

One way of scheduling of radio resources with reduced signaling effort is to use persistent scheduling, i.e. scheduling with predefined transmission time intervals for the initial transmissions and retransmissions of transport blocks from a base station to a user terminal or with predefined transmission parameters, like e.g. the modulation and coding scheme (MCS). If retransmissions are performed synchronously, i.e. in a fixed timely relative offset to the initial transmission, the transmission time intervals for the retransmissions are predefined as well. As with such synchronous retransmissions all the transmission time intervals used for the transmission from the base station are predefined, there is no need for signaling to the user terminal the transmission time intervals that can be used by the base station for sending data to the user terminal, which reduces the signaling effort.

However, persistent scheduling has the disadvantage of a potential waste of radio resources, as in the base station, transmission time intervals are reserved for transmission and retransmission to the user terminal that are unused in case of periods of silence in which the persistently scheduled radio resources are unused.

If for a service, the predefined radio resources remain unused, such as during silence periods in VoIP services, without further measures, the radio resources cannot be reallocated to other user terminals, because the user terminal originally assigned to these radio resources will try to demodulate and decode the transmission and generate a feedback, which is negative in this case.

SUMMARY OF THE INVENTION

The object of the invention is thus to propose a method for a scheduling of service data in downlink using persistent scheduling with a reduced waste of radio resources, i.e. with an improved usage of predefined transmission time intervals, and which overcomes the above mentioned objections.

This object is achieved by a method according to the teaching of claim 1, a user terminal according to the preamble of claim 11, a base station according to the preamble of claim 13, and a communication network according to the preamble of claim 14.

The main idea of the invention is, that a base station sends a control message to a user terminal indicating when the user terminal shall perform reception of downlink data or when and under which circumstances the user terminal shall send HARQ feedback information (HARQ=Hybrid Automatic Repeat Request) in upcoming transmission time intervals. Thus, the method according to the invention is based on a special signaling related to a dynamic reallocation of radio resources resulting in a special behavior of the user terminal, i.e. the original assigned user terminal does not need to listen for transmissions and retransmissions and shall not send any negative feedback.

Further developments of the invention can be gathered from the dependent claims and the following description.

BRIEF DESCRIPTION OF THE DRAWINGS

In the following the invention will be explained further making reference to the attached drawings.

A communication network in which the invention can be implemented comprises user terminals and base stations.

Figure 1:
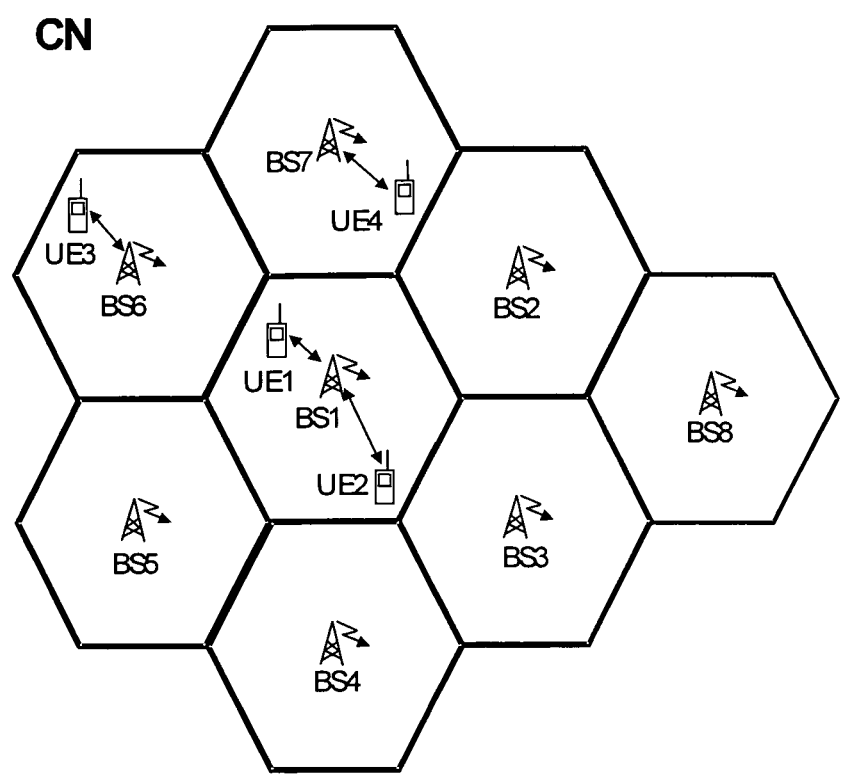
FIG. 1 schematically shows a communication network in which the invention can be implemented.

FIG. 1 shows an example for such a communication network CN that comprises base stations BS1-BS8 and user terminals UE1-UE4.

Each of said user terminals UE1-UE4 is connected to one or multiple of said base stations BS1-BS8, which is symbolized by double arrows in FIG. 1. The base stations BS1-BS8 are in turn connected to a core network, which is not shown in FIG. 1 for the sake of simplicity.

The user terminals UE1-UE4 comprise the functionality of a user terminal for transmission and reception of signaling and data messages in a network using radio transmission.

Furthermore, a user terminal UE1-UE4 according to the invention is adapted to perform reception and evaluation of at least one control message that comprises or allows for a determination of at least one of the orders when the user terminal shall perform reception of downlink data and when and under which circumstances the user terminal shall send HARQ feedback information in upcoming transmission time intervals.

In an embodiment of the invention, a user terminal UE1-UE4 according to the invention is adapted to perform reception and evaluation of at least one control message that comprises or allows for a determination of at least one of the orders that the user terminal shall not send any negative acknowledgements for HARQ processes of service data anymore, that the user terminal shall not wait for any transport block retransmissions, and that the user terminal shall change the predefinition of transmission time intervals for possible initial transmissions of transport blocks.

The base stations BS1-BS8 comprise the functionality of a base station of a network using radio transmission, i.e. they provide the possibility for user terminals to get connected to said network and for data exchange of said user terminals by means of radio transmission.

Furthermore, a base station BS1-BS8 according to the invention is adapted to perform generation and transmission of at least one control message which comprises or allows for a determination of at least one of the orders when a user terminal shall perform reception of downlink data and when and under which circumstances a user terminal shall send HARQ feedback information in upcoming transmission time intervals.

Figure 2:
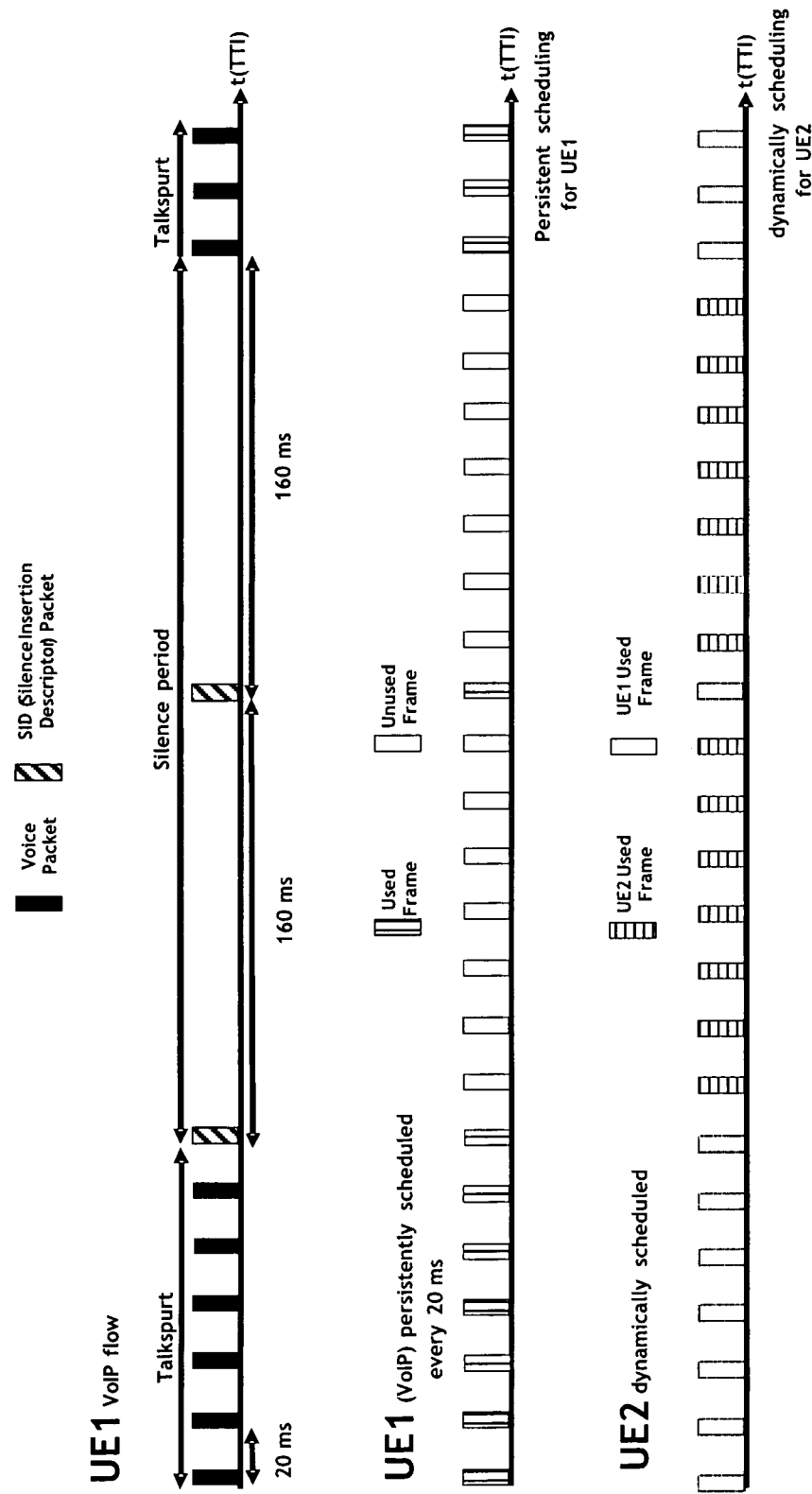
FIG. 2 schematically shows downlink service data transmission in packets in predefined transmission time intervals using persistent and dynamic scheduling.

FIG. 2 shows a possible downlink service data transmission in packets in predefined transmission time intervals using persistent and dynamic scheduling based on the prior art disclosed in chapter 11.1 and 11.2 in the document 3GPP TS 36.300 VL.0.0 (2007-03) which will be described in the following.

FIG. 2 shows the transmission of data packets related to VoIP traffic in persistently and dynamically scheduled transmission time intervals depicted along a time axis t. The frequencies used for transmission are preferably grouped in resource blocks, and the user terminals UE1, UE2 get allocated dedicated resource blocks for transmission.

For conversational and streaming services such as e.g. VoIP, there is a different periodicity for talkspurt periods compared to silence periods. Usual values are 20 ms for the talkspurt period and 160 ms for the silence period.

In the upper part of FIG. 2, it is depicted, that during a talkspurt period, the user terminal UE1 is persistently scheduled with an interval of 20 ms, i.e. downlink data are transmitted to the user terminal UE1 in transmission time intervals with a period of 20 ms. The voice data packets transmitted in downlink to the user terminal UE1 are depicted in black in the upper part of FIG. 2.

The VoIP traffic flow includes periods of silence in which the persistently scheduled radio resources are not used by the user terminal UE1 due to the unavailability of VoIP packets sent in downlink.

The persistently scheduled user terminal UE1 is scheduled with synchronous HARQ, i.e. there are predefined transmission time intervals in which the user terminal UE1 expects retransmissions of packets sent in downlink from the base station. Thus no further signalling from the base station is required until a silence period is detected at the base station.

It is assumed, that the base station can easily detect silence periods either by means of the buffer management in the base station, e.g. if the buffer is empty for multiples of the so-called voice packet inter arrival time, which corresponds to a reduction of the data rate in downlink, or by means of a variation of the size of the SID packets in silent periods compared to voice data packets during a talkspurt period.

If a silence period is detected for the user terminal UE1, the base station indicates the beginning of a silence period by means of a so-called Silence Insertion Description (SID) packet sent in downlink from the base station. In the upper part of FIG. 2, the SID packets are depicted with diagonal lines.

Additional to an SID packet, the base station also sends a control message comprising an indication for the activation of the so-called suspend HARQ Period, during which the user terminal shall not expect retransmissions of packets sent in downlink from the base station and shall not send negative acknowledgements to the base station.

Preferably, said control message is a layer one, i.e. typically physical layer, control protocol message, a layer two, i.e. typically medium access control, protocol message, or a layer three, i.e. typically radio resource control, protocol message. The sending of said control message is preferably initiated by a scheduling instance of the base station BS1.

Said control message can be sent as a separated message, but is preferably attached to a medium access control protocol data unit which is used to transfer user data from the base station BS1 to the user terminal UE1.

During said suspend HARQ period operation, at least one of the following features characterizes the behaviour of the user terminal UE1:

The user terminal UE1 only decodes the persistently scheduled radio resources in transmission time intervals TTI that are predefined for an initial transmission, i.e. the user terminal UE1 does not decode within transmission time intervals TTI that are predefined for HARQ retransmissions.

If in subsequent transmission time intervals TTI, the user terminal UE1 is not successfully decoding a transport block, it does not send a negative acknowledgement, i.e. no negative acknowledgement is sent during a suspend HARQ Period at all.

As soon as an initial transmission of a voice data packet is recognized, i.e. a transport block is successfully decoded, an acknowledgement is generated and sent to the base station, and the user terminal UE1 returns to persistent scheduling mode including transmissions of (negative) acknowledgements as defined before the suspend HARQ period.

In the middle part of FIG. 2, the used and unused frames for the downlink data traffic of the user terminal UE1 are shown. The used frames are depicted with vertical lines and comprise voice data packets and SID packets, the unused frames are depicted in white.

The radio resources not used by the user terminal UE1 during a silence period can be assigned to one or several user terminals, like e.g. to the user terminal UE2 in FIG. 2. The scheduling of said radio resources will be dynamically announced by layer one or layer two signalling, i.e. the allocation for a defined number of transmission time intervals is explicitly indicated by the base station.

Thus, during a silence period, i.e. during a suspend HARQ period, of the persistently scheduled user terminal UE1, the base station will be able to dynamically reallocate unused persistently scheduled radio resources to other user terminals, as e.g. the user terminal UE2 in the example in FIG. 2. Said dynamically scheduled user terminals are in asynchronous HARQ operation, i.e. the allocation of dedicated transmission time intervals for retransmission in downlink to said user terminals is explicitly indicated by the base station.

In the lower part of FIG. 2, it is shown that frames, that are not used by the user terminal UE1, are dynamically allocated to the user terminal UE2. Said frames used by user terminal UE2 are depicted with horizontal lines, and the frames not used by user terminal UE2 are depicted in white.

To further improve the efficiency during silence periods in terms of e.g. user terminal power consumption resulting in increased battery life, a so-called intermediate discontinuous reception (DRX) interval can be activated, too.

If a silence period is detected for the user terminal UE1, the base station BS1 sends additional information within the control message which is sent e.g. in a layer one, i.e. typically physical layer, control protocol message, a layer two, i.e. typically medium access control, protocol message, or in a layer three, i.e. typically radio resource control, protocol message. Said additional information e.g. relates to the duration of the intermediate DRX interval.

In case such an intermediate DRX interval was set, and one voice data packet arrives during said period at the base station, the next persistently scheduled radio resource after the intermediate DRX interval can be used to transfer this voice data packet.

In case such an intermediate DRX interval was set, and two or more voice data packets arrive during said period at the base station, the next persistently scheduled radio resource after the intermediate DRX interval can easily be adapted by dynamic scheduling to support the content for e.g. 2 voice data packets.

Figure 3:
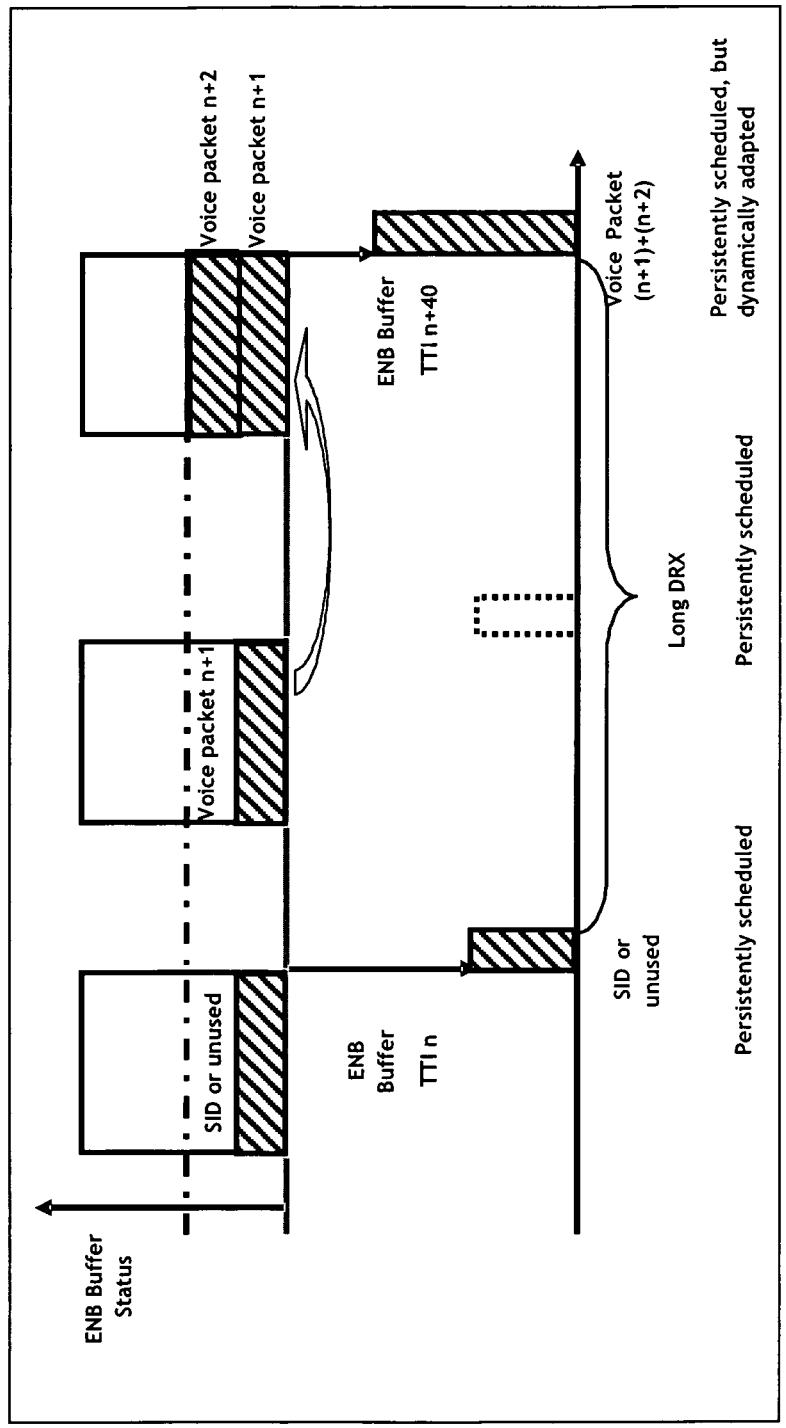
FIG. 3 schematically shows a downlink service data transmission in packets with packet bundling, i.e. frame aggregation, using dynamic scheduling.

In the upper part of FIG. 3, the status of a buffer of the base station BS1 containing packets intended to be sent to the user terminal UE1 is shown before, during and after an intermediate DRX interval.

In the lower part of FIG. 3, the packets that are sent to the user terminal UE1 are depicted along the time axis. The intermediate DRX interval is identified by means of a bracket.

Before the intermediate DRX period, the buffer contains a SID packet which is sent to the user terminal UE1.

After reception of the SID packet by the user terminal UE1, the intermediate DRX interval starts.

After each intermediate DRX interval, which is valid during silence periods, the user terminal UE1 will try to demodulate and decode the persistently allocated radio resources in transmission time intervals for initial transmissions only. The duration of an intermediate DRX interval could e.g. be 40 ms.

As soon as an initial transmission of a voice data packet is recognized, i.e. a transport block is successfully decoded, the intermediate DRX period ends implicitly and the user terminal UE1 returns to the operation defined in the persistent scheduling mode as defined before the intermediate DRX interval.

If the user terminal does not successfully demodulate and decode the persistently allocated radio resources in transmission time intervals for initial transmissions after an intermediate DRX interval, a new intermediate DRX interval can be started.

Voice data packets arriving within an intermediate DRX interval at the base station BS1 can either not be transferred at all or can be deferred to the next transmission time interval for initial transmission after an intermediate DRX interval. Such packets can be bundled together with all other packets that may arrive during the intermediate DRX interval, too. In this case, dynamic scheduling can be applied to indicate to the user terminal UE1 the changed amount of radio resources.

In the example of FIG. 3, it is shown, that the voice data packet n+1 is stored in the buffer till the end of the intermediate DRX interval, and is sent to the user terminal UE1 together with the voice data packet n+2 after the intermediate DRX interval.

The invention claimed is:

1. A method for scheduling downlink service data, comprising:
    sending at least one control message from a base station to a user terminal for scheduling downlink service data to be sent from the base station to the user terminal over radio interfaces, wherein one or more of said at least one control message comprises at least one of an order when the user terminal shall perform reception of downlink data and an order when and under which circumstances the user terminal shall send HARQ feedback information in upcoming transmission time intervals; and
    detecting a silence period in a persistently scheduled downlink between the base station and the user terminal at the base station through recognition of a reduction of a data rate of the service data sent to the user terminal;
    wherein the sending of the at least one control message is initiated in conjunction with the detecting of the silence period.

2. The method according to claim 1, wherein one or more of said at least one control message includes one of a layer one control protocol message, a layer two control protocol message, and a layer three control protocol message.

3. The method according to claim 1, wherein the sending of one or more of said at least one control message is initiated by a scheduling instance of the base station.

4. The method according to claim 1, wherein one or more of said at least one control message is attached to a medium access control protocol data unit which is used to transfer user data from the base station to the user terminal.

5. The method according to claim 1, wherein one or more of said at least one control message includes an order that the user terminal after reception of the at least one control message shall not wait for transport block retransmissions.

6. The method according to claim 1, wherein one or more of said at least one control message includes an order that the user terminal shall change predefined transmission time intervals for possible initial transmissions of transport blocks.

7. The method according to claim 1, wherein one or more of said at least one control message includes an order that the user terminal shall not send negative acknowledgements for HARQ processes of service data to the base station.

8. The method according to claim 1, wherein one or more of said at least one control message comprises information for at least one discontinuous reception cycle of the user terminal.

9. The method according to claim 1, wherein the user terminal returns to predefined transmission time intervals that were valid before reception of one or more of said at least one control message after successful reception and acknowledgment of an initial transmission of at least one transport block.

10. A user terminal, comprising:
    a receiver configured to receive at least one control message from a base station, the at least one control message being for scheduling downlink service data to be sent from the base station to the user terminal over radio interfaces, wherein one or more of the at least one control message comprises at least one of an order when the user terminal shall perform reception of downlink data and an order when and under which circumstances the user terminal shall send HARQ feedback information in upcoming transmission time intervals; and at least one processor configured to evaluate the at least one control message;

wherein the sending of the at least one control message is initiated by the base station after the base station detects a silence period in a persistently scheduled downlink between the base station and the user terminal through recognition of a reduction of a data rate of the service data sent to the user terminal.

11. The user terminal according to claim 10, wherein one or more of said at least one control message comprises at least one of an order that the user terminal shall not send negative acknowledgements for HARQ processes of service data, an order that the user terminal shall not wait for transport block retransmissions, and an order that the user terminal shall change predefined transmission time intervals for possible initial transmissions of transport blocks.

12. A base station, comprising:
at least one processor configured to generate at least one control message for scheduling downlink service data to be sent from the base station to a user terminal over radio interfaces, wherein the at least one control message comprises at least one of an order when the user terminal shall perform reception of downlink data and an order when and under which circumstances the user terminal shall send HARQ feedback information in upcoming transmission time intervals, wherein the at least one processor is also configured to detect a silence period in a persistently scheduled downlink between the base station and the user terminal through recognition of a reduction of a data rate of the service data sent to the user terminal; and a transmitter configured to transmit the at least one control message to the user terminal;

wherein the at least one processor and transmitter are configured such that transmission of the at least one control message is initiated in conjunction with detection of the silence period.

13. A communication network for scheduling downlink service data, comprising:
a user terminal; and
a base station;
the user terminal comprising
a receiver configured to receive at least one control message from the base station, the at least one control message being for scheduling downlink service data to be sent from the base station to the user terminal over radio interfaces, wherein one or more of the at least one control message comprises at least one of an order when the user terminal shall perform reception of downlink data and an order when and under which circumstances the user terminal shall send HARQ feedback information in upcoming transmission time intervals; and at least one terminal processor configured to evaluate the at least one control message;

the base station comprising
at least one station processor configured to generate said at least one control message, wherein the at least one station processor is also configured to detect a silence period in a persistently scheduled downlink between the base station and the user terminal through recognition of a reduction of a data rate of the service data sent to the user terminal; and a transmitter configured to transmit the at least one control message to the user terminal;

wherein the at least one station processor and transmitter are configured such that transmission of the at least one control message is initiated in conjunction with detection of the silence period.

14. The user terminal according to claim 10 wherein the user terminal is configured to return to predefined transmission time intervals were valid before reception of one or more of the at least one control message after successful reception and acknowledgement of an initial transmission of at least one transport block.

15. The base station according to claim 12 wherein one or more of the at least one control message includes one of a layer one control protocol message, a layer two control protocol message, and a layer three control protocol message.

16. The base station according to claim 12 wherein the sending of one or more of the at least one control message is initiated by a scheduling instance of the base station.

17. The base station according to claim 12 wherein one or more of the at least one control message is attached to a medium access control protocol data unit which is used to transfer user data from the base station to the user terminal.

18. The base station according to claim 12 wherein one or more of the at least one control message comprises information for at least one discontinuous reception cycle of the user terminal.

19. The base station according to claim 12 wherein one or more of said at least one control message comprises at least one of an order that the user terminal shall not send negative acknowledgements for HARQ processes of service data, an order that the user terminal shall not wait for transport block retransmissions, and an order that the user terminal shall change predefined transmission time intervals for possible initial transmissions of transport blocks.

20. The communication network according to claim 13 wherein one or more of said at least one control message comprises at least one of an order that the user terminal shall not send negative acknowledgements for HARQ processes of service data, an order that the user terminal shall not wait for transport block retransmissions, and an order that the user terminal shall change predefined transmission time Intervals for possible initial transmissions of transport blocks.

* * * * *